US009183557B2

(12) United States Patent
Patwa et al.

(10) Patent No.: US 9,183,557 B2
(45) Date of Patent: Nov. 10, 2015

(54) ADVERTISING TARGETING BASED ON IMAGE-DERIVED METRICS

(75) Inventors: Pritesh Patwa, Redmond, WA (US); Wook Jin Chung, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 657 days.

(21) Appl. No.: 12/869,372

(22) Filed: Aug. 26, 2010

(65) Prior Publication Data

US 2012/0054039 A1 Mar. 1, 2012

(51) Int. Cl.
*G06Q 30/02* (2012.01)
*G06Q 30/00* (2012.01)

(52) U.S. Cl.
CPC ............ *G06Q 30/00* (2013.01); *G06Q 30/0241* (2013.01); *G06Q 30/0251* (2013.01); *G06Q 30/0269* (2013.01)

(58) Field of Classification Search
CPC .......... G06Q 30/0241; G06Q 30/0251; G06Q 30/0269
USPC .............................................. 705/14.1–14.73
See application file for complete search history.

(56) References Cited

U.S. PATENT DOCUMENTS

| 7,689,672 | B2 * | 3/2010 | Kanojia et al. | 709/219 |
|---|---|---|---|---|
| 8,146,005 | B2 * | 3/2012 | Jones et al. | 715/760 |
| 2002/0091568 | A1 | 7/2002 | Kraft et al. | |
| 2005/0018216 | A1 * | 1/2005 | Barsness et al. | 358/1.6 |
| 2008/0004953 | A1 * | 1/2008 | Ma et al. | 705/14 |
| 2008/0004959 | A1 | 1/2008 | Tunguz-Zawislak et al. | |
| 2008/0010128 | A1 * | 1/2008 | Allen | 705/14 |
| 2008/0015878 | A1 | 1/2008 | Feng et al. | |

(Continued)

FOREIGN PATENT DOCUMENTS

| CN | 1848168 A | 10/2006 |
|---|---|---|
| CN | 101789111 A | 7/2010 |

OTHER PUBLICATIONS

Vara, Vauhini, "Facebook Gets Personal With Ad Targeting Plan", Retrieved at <<http://online.wsj.com/article/SB118783296519606151.html>>, Aug. 23, 2007, pp. 3.

Karp, Scott, "Yahoo SmartAds Tackles Online Display Advertising's Customization Problem", Retrieved at <<http://publishing2.com/2007/07/02/yahoo-smartads-tackles-online-display-advertisings-customization-problem/,>>, Jul. 2, 2007, pp. 5.

"Google Advertising Patents for Behavioral Targeting, Personalization and Profiling", Retrieved at <<http://www.searchenginejournal.com/google-advertising-patents-for-behavioral-targeting-personalization-and-profiling/2311/>>, Oct. 7, 2005, pp. 9.

(Continued)

*Primary Examiner* — Jami A Plucinski
*Assistant Examiner* — Sam Refai
(74) *Attorney, Agent, or Firm* — Joann Dewey; Danielle Johnston-Holmes; Micky Minhas

(57) ABSTRACT

Advertising targeting metrics for individuals can be derived from images associated with those individuals. Such advertising targeting metrics can include physical attributes, as well as preferences based on prior activity, or history. Public images associated with specific user identities can be processed and advertising targeting metrics can be derived therefrom to more accurately tailor the advertisements displayed to the individuals associated with those user identities. Additionally, non-public images can be likewise processed, either remotely or, for greater privacy, locally if so allowed by the user. Advertisers can then utilize the greater breath of advertising targeting metrics that can be derived from images to more accurately target advertisements to specific groups. In doing so, advertisers can submit their own images of exemplary targeted users, and the targeting metrics for those advertisers' advertisements can be automatically derived from the submitted images utilizing equivalent algorithms.

19 Claims, 6 Drawing Sheets

(56) References Cited

U.S. PATENT DOCUMENTS

| | | | |
|---|---|---|---|
| 2008/0204450 A1* | 8/2008 | Dawson et al. | 345/419 |
| 2008/0243531 A1* | 10/2008 | Hyder et al. | 705/1 |
| 2009/0006187 A1* | 1/2009 | Marcuvitz | 705/10 |
| 2009/0028434 A1* | 1/2009 | Vanhoucke et al. | 382/182 |
| 2009/0044113 A1* | 2/2009 | Jones et al. | 715/707 |
| 2009/0148045 A1 | 6/2009 | Lee et al. | |
| 2009/0193055 A1* | 7/2009 | Kuberka et al. | 707/104.1 |
| 2010/0138285 A1* | 6/2010 | Leonard et al. | 705/14.5 |
| 2010/0145806 A1 | 6/2010 | Choi et al. | |
| 2011/0052012 A1* | 3/2011 | Bambha et al. | 382/118 |
| 2011/0093780 A1* | 4/2011 | Dunn et al. | 715/706 |
| 2011/0282727 A1* | 11/2011 | Phan et al. | 705/14.36 |
| 2012/0011002 A1* | 1/2012 | Crowe et al. | 705/14.66 |

OTHER PUBLICATIONS

Clark, et al., "Microsoft and Intel offer smart-sign technology", Retrieved at <<http://online.wsj.com/article/SB10001424052748704055104574652742982646768.html?mod=WSJ_hpp_sections_tech>>, Jan. 12, 2010, pp. 3.

"Project Natal and Facial Expression Recognition", Retrieved at <<http://www.microsoft.com/presspass/features/2010/jan10/01-06CESKeynote.mspx>>, Jan. 6, 2010, pp. 3.

Varma, Ashutosh, "Method for delivery of personalized keyword-based Ads using client-side re-ranking", Retrieved at <<http://www.freepatentsonline.com/y2007/0143260.html>>, May 20, 2010, pp. 8.

* cited by examiner

ADVERTISING TARGETING BASED ON IMAGE-DERIVED METRICS

BACKGROUND

Like traditional advertising, advertising displayed to a user through a computing device attempts to elicit a desired response from the user, such as to cause the user to purchase the advertised product or service. And like traditional advertising, advertising displayed to users through a computing device has a greater chance of eliciting the desired response from the user if the displayed advertising is relevant, or meaningful, to the user. Unlike traditional advertising, however, advertising displayed to users through a computing device can be based on information derived from that user's interactions with that computing device. Thus, while traditional advertising is only generically targeted, such as, for example, by placing advertisements for men's products in automotive-centric publications, advertising displayed to users through a computing device can be targeted much more specifically. For example, a user that has searched for specific terms can be assumed to be interested in products associated with those terms, and advertisements for such products can be displayed to such a user.

One mechanism for collecting information about a user, that can be utilized to target advertisements to be displayed to that user through a computing device, is to observe the behavior of the user in their interaction with the computing device. For example, as indicated previously, the words or phrases that a user enters into a search engine can be utilized to target specific advertisements to such a user. Other meaningful behavior of the user and their interaction with the computing device can include the types of websites, or other informational content, that the user consumes via the computing device, and the duration and frequency of the consumption of such informational content. Thus, a user that visits automotive-centric informational content on a frequent basis may be targeted with automotive-centric advertising, while a user that visits such automotive-centric informational content only rarely may not be so targeted.

SUMMARY

In one embodiment, publically available images associated with a user can be analyzed to derive therefrom information that can be utilized to more precisely target advertisements to that user. Such advertising "targeting metrics" can include information about the user, including the user's physical attributes, such as whether the user is bald or wears glasses, and can also include information about the user's preferences as expressed in the user's habits or history, such as whether the user likes to travel, or whether the user prefers indoor or outdoor activities.

In another embodiment, a user can "opt-in" and allow their non-public images to be utilized to derive advertising targeting metrics from them. Such non-public images can include static images, such as would be found in a user's digital photo album and can also include images captured from a video, such as a video chat in which the user may be participating.

In a further embodiment, to enhance privacy, non-public images can be processed locally on a user's computing device. Potential advertisements can be provided to the user's computing device and can be cached there. Processes executing on the user's computing device can, based upon the advertising targeting metrics derived from the processing of non-public images, select advertisements to be displayed to the user, from among the advertisements cached on the user's computing device.

In a still further embodiment, an interface can be provided to advertisers to enable such advertisers to select how their advertisements are to be targeted in light of the additional advertising targeting metrics that can be derived from images associated with users. Such an interface can comprise a traditional "must-have" and "like-to-have" conditional combinations, such as can be selected through traditional interfaces. However, such an interface can also comprise graphical elements to aid an advertiser in selecting advertising targeting metrics that are based on a user's physical characteristics, such as by illustrating exemplary avatars to which their advertisements can be targeted, or enabling the advertiser to upload images of exemplary users to which their advertisements can be targeted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
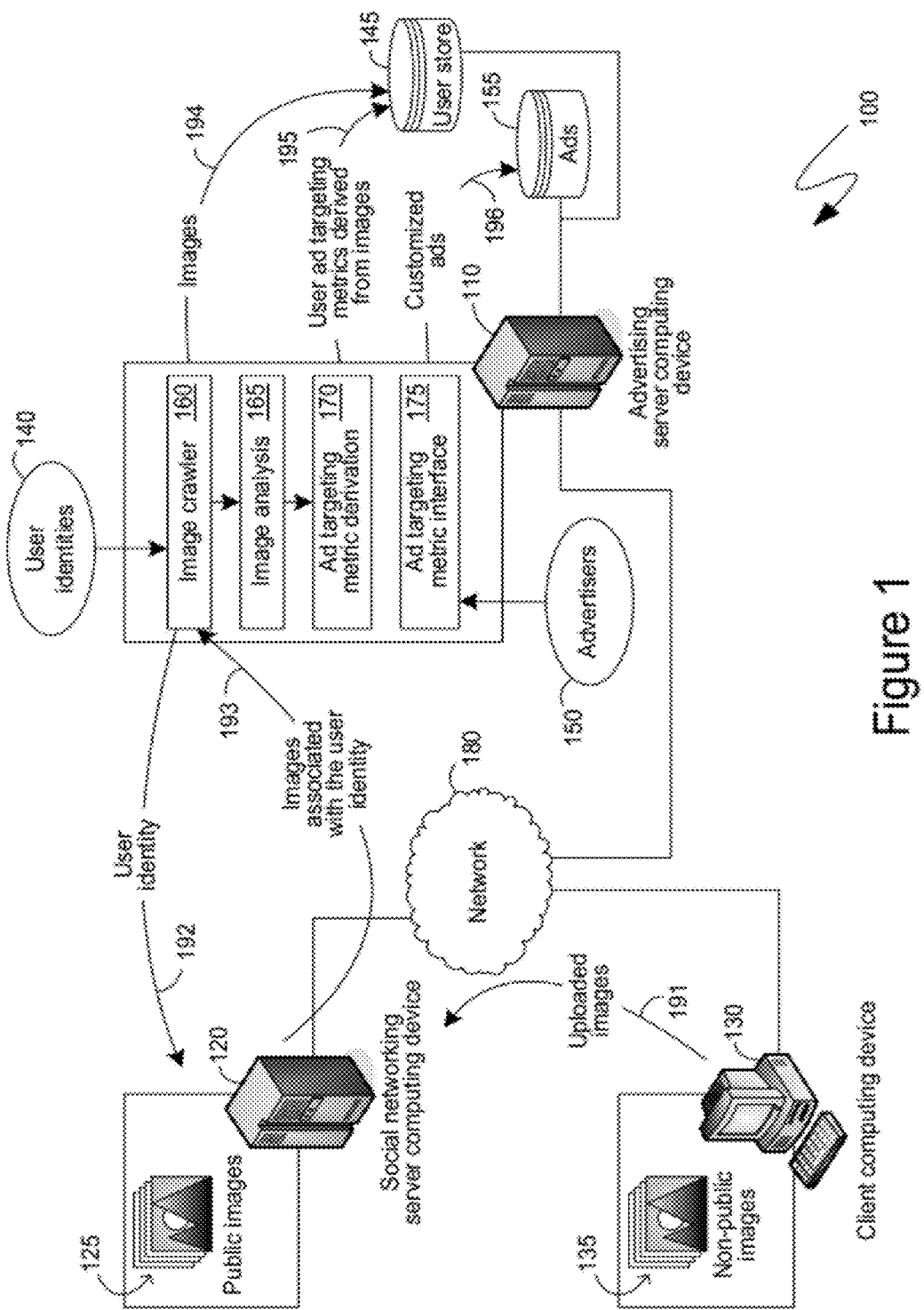
FIG. 1 is a block diagram of an exemplary network of computing devices.

The following description relates to the derivation of advertising targeting metrics from images associated with users. Publicly available images associated with a given user can be analyzed to derive therefrom advertising targeting metrics associated with that user. Such advertising targeting metrics can include the user's physical attributes, as well as information regarding the user's preferences. The advertising targeting metrics can also be derived from non-public images that the user allows to be processed. Such processing can occur remotely or, for privacy purposes, can be performed by the computing device on which the user has, or generates, such non-public images. An interface for advertisers can be presented that enables the advertiser to take advantage of advertising targeting metrics derived from images associated with users. Such an interface can, in addition to comprising traditional interface elements, also comprise visual feedback of the selected advertising targeting metrics, such as via an avatar that can represent targeted physical attributes, or can enable an advertiser to upload an image of an exemplary target audience.

For purposes of illustration, the techniques described herein make reference to an existing social networking infrastructure comprising the ubiquitous Internet and World Wide Web, as well as social networking websites and relevant hardware, such as computing devices, digital cameras and video cameras typically referred to as "webcams". Such references, however, are strictly exemplary and are not intended to limit the mechanisms described to the specific examples provided. Indeed, the techniques described are applicable to any system comprising images associated with specific users to whom advertisements can be targeted.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising a client computing device 130, a social networking server computing device 120, and an advertising server computing device 110. The client computing device 130, the social networking server computing device 120 and the advertising server computing device 110 can be communicationally coupled to one another via the network 180. As will be recognized by those skilled in the art, the network 180 can provide communicational connections between a myriad of computing devices, and the computing devices illustrated in the system 100 of FIG. 1 are strictly exemplary and are shown to provide a visual guide to mechanisms that can be scaled and repeated, in an obvious manner, across other computing devices communicationally coupled to network 180.

The client computing device 130 can be any computing device traditionally utilized by a user to perform various functions. For example, the client computing device 130 can typically be a laptop or desktop computer such as would be purchased and utilized by individual users, or families of users. In the system 100 of FIG. 1, the client computing device 130 is shown as comprising a set of non-public images 135. The non-public images 135 can include images that a user of the client computing device 130 took with their own camera, such as a digital camera, or a traditional analog film camera crews resulting paper images were subsequently scanned into the client computing device 130, and the non-public images 135 can also include images retained by a user of the client computing device 130 even though they were not taken by such a user including, for example, images of the user themselves that were taken by others and then provided to that user, such as through e-mail or electronic file sharing. The non-public images 135 can also include images being generated by hardware communicationally coupled with the client computing device 130. For example, if a user of the client computing device 130 is engaging in a video conference, a digital video camera, such as the digital video camera 651 shown in FIG. 6, that can be communicationally coupled to the client computing device 130, can be continuously capturing images of the user during such a video conference. While such images may not be retained, such as by being stored on a non-volatile storage medium, they can, nevertheless, be considered as part of the non-public images 135 that can, at least temporarily, be available on the client computing device 130.

In certain circumstances, individuals, such as a user of the client computing device 130, can participate in social networking via the communicational connection between multiple client computing devices, such as the client computing device 130, and the network 180. To facilitate such social networking, social networking server computing devices, such as the social networking server computing device 120, can be established and maintained by various entities. For example, one common mechanism for social networking, via the network 180, is the utilization of social networking websites that enable users to share information about themselves and connect with other users. In such an example, the network 180 can represent the ubiquitous Internet or equally ubiquitous World Wide Web. The social networking server computing device 120, therefore, can be one of multiple server computing devices that can host such social networking websites.

Within the context of social networking via the network 180, one or more of the non-public images 135 that a user can have available on a client computing device 130 can be provided by such a user, as indicated by the action 191 of the system 100 of FIG. 1, to a social networking server computing device. Users can provide such images to facilitate social networking, such as to share experiences with other users, or to enable other users to more easily identify them. While some of the images provided to a social networking server computing device can remain non-public, in the sense that they can be accessed only by a select group, or in the sense that they can be protected from broader dissemination, such as via a password, other uploaded images can become public images, such as the public images 125 retained by the social networking server computing device 120. Such public images 125 can be accessed by any computing device communicationally coupled to the network 180.

In one embodiment, as illustrated by the system 100 of FIG. 1, an advertising server computing device 110 can utilize an image crawler 160 to access public images maintained by various computing devices communicationally coupled to the network 180, such as the public images 125 maintained by the social networking server computing device 120. Once accessed, the public images 125 can be analyzed by the advertising server computing device 110 to derive therefrom information about one or more users associated with the public images 125 that can be utilized to target advertisements to those users. Such advertising targeting metrics can be stored, together with an identification of the user with which such advertising targeting metrics are associated, in a user store 145 that can be communicationally coupled to the advertising server computing device 110. Subsequently, when an advertiser, such as one of the advertisers 150, provides an advertisement that the advertiser wishes to have targeted to a specific class of individuals, the advertising server computing device 110 can make reference to the user store 145 and, when the advertising server computing device detects a user associated with the appropriate advertising targeting metrics, the advertising server computing device can cause the advertisement to be displayed to such a user.

Initially, to populate the user store 145, the advertiser server computing device 110 can obtain a set of user identities 140. In one embodiment, the user identities 140 can be identities established by users of websites, or other network entities offering services via the network 180, that can uniquely identify such users. For example, the user identities 140 can be e-mail addresses, network passport identifiers, such as can be utilized across multiple websites, or other like identifiers.

Once the advertising server computing device 110 has obtained the user identities 140, it can utilize an image crawler 160 to obtain public images that are associated with the user identities 140. Public images associated with various user identities, such as the user identities 140, can be obtained from a variety of sources communicationally coupled to the network 180. Such sources can include the aforementioned social networking sites, as well as other image-centric sites, such as, for example, those dedicated to amateur photographers, or those providing online photo album services that enable users to host their images so that other users can access and view them. In the particular example illustrated by the system 100 of FIG. 1, the image crawler 160 can obtain images associated with a specific user identity from a social networking site, as would be hosted, at least in part, by the social networking server computing device 120.

The image crawler 160, as illustrated by the communication 192, can provide a selected user identity, from among the user identities 140, to the social networking server computing device 120. In response, as illustrated by the communication 193, the social networking server computing device 120 can return those public images, such as from the public images 125, that are associated with the user identity that was provided by the image crawler 160 in the communication 192. In such a manner, the image crawler 160 can cycle through each of the user identities 140, obtaining, for each user identity, the images, from among the public images 125 hosted by the social networking server computing device 120, that are associated with each individual user identity. The image crawler 160 can then similarly cycle through each of the user identities 140 at other sites or locations on the network 180 that may have public images, such as the public images 125, that may be associated with one or more of the user identities from among the user identities 140.

As the image crawler 160 obtains images associated with a given user identity, the image crawler can, in one optional embodiment, store such images in the user store 145 such that they are linked to the user identity with which they are associated. Such an optional storing of the images themselves can enable subsequent reprocessing of the images should the image analysis algorithms be updated, or otherwise subsequently changed. The communication 194, shown in the system 100 of FIG. 1, illustrates such an optional storing of the images received by the image crawler 160 in the user store 145 that is communicationally coupled to the advertising server computing device 110.

Once the image crawler 160 has obtained a set of images associated with a given user identity, those images can be subsequently analyzed by an image analysis 165. In one embodiment, the image analysis 165 can first analyze the images to perform facial recognition, such that images that do not include identifiable humans can be filtered out. Subsequently, from among the faces that the image analysis 165 recognized, the image analysis 165 can further identify common features between those faces to attempt to identify images of the user with whose user identity the images were associated. More specifically, by identifying common features between those faces, the image analysis 165 can identify the same individuals across multiple images. In one embodiment, the user with whose user identity the images were associated can be assumed to be the individual who is in the greatest amount of images. In another embodiment, context analysis, such as that described in further detail below, can be utilized to identify what the individual associated with the user identity "looks like". For example, images used as an user's profile image typically contain an image of the individual who is that user. Image analysis, such as the above referenced facial recognition and differentiation are well known in the art, and known, existing, algorithms can be utilized as part of the image analysis 165.

In another embodiment, the image analysis 165 can first analyze the images to identify those images taken by the user with whose user identity the images were associated. As will be described in further detail below, an identification of images that may have been taken by the user with whose user identity the images were associated can be obtained from meta-data associated with the images. Alternatively, or in addition, images that may have been taken by the user with whose user identity the images were associated can be identified through contextual analysis. For example, images obtained from computing device hosting a site that enables users to share their photography and showcase their photographic abilities can be assumed to have been taken by the user from whose account they were obtained.

Ultimately, the image analysis 165 can provide selected images to an advertising targeting metric derivation 170, which can then derive, from those selected images, advertising targeting metrics relevant to that user. For example, the advertising targeting metric derivation 170 can determine, through known image analysis algorithms, whether the individual pictured, and identified as the user, has a full head of hair or is bald. As another example, the advertising targeting metric derivation 170 can determine, again through known image analysis algorithms, the eye color, hair color, skin color, and like physical attributes of the individual pictured and identified as the user. As yet another example, the advertising targeting metric derivation 170 can determine, through known image analysis algorithms, whether the individual pictured and identified as the user relies on any external aids, such as, for example, eyeglasses, wheelchairs, prosthetics, or other like devices.

In addition to deriving advertising targeting metrics based upon the physical aspects and attributes of the individual pictured and identified as the user with whose user identity these images were associated, the advertising targeting metric derivation 170 can also derive advertising targeting metrics based upon an analysis of the selected images in aggregate. In one embodiment, the advertising targeting metric derivation 170 can derive advertising targeting metrics via the subject matter of the images. For example, a user associated with images of dogs can be assumed to own, or at least like, dogs. Similarly, a user associated with images of children, especially one or more common children that appear in multiple images, can be assumed to be a parent. In another embodiment, the advertising targeting metric derivation 170 can derive advertising targeting metrics that reflect an individual's preferences by analyzing the environment of the selected images. For example, utilizing known image analysis algorithms, the advertising targeting metric derivation 170 can identify whether a meaningful number of the images were taken inside or outdoors. From such information, the advertising targeting metric derivation 170 can surmise or deduce that the user prefers indoor or outdoor activities, respectively. As another example, again utilizing known image analysis algorithms, the advertising targeting metric derivation 170 can identifying whether a meaningful number of the images were taken in daylight or artificial light. From such information, the advertising targeting metric derivation 170 can deduce that the user prefers daytime or nighttime activities, respectively.

The advertising targeting metric derivation 170 can also take into account metadata that may be associated with the selected images that include the user, such as in the manner referenced previously. In one embodiment, the images may comprise date stamps, or other date information, from which the advertising targeting metric derivation 170 can establish a timeline of events, or can determine which advertising targeting metrics are more recent, or more accurate. For example, the advertising targeting metric derivation 170 can utilize date metadata to determine that the images of the user in which the user has blonde hair are more recent than the images of the user in which the user has dark hair. Consequently, the advertising targeting metric derivation 170 can determine that the user colors their hair. As another example, the advertising targeting metric derivation 170 can utilize date metadata to determine that the images of the user in which the user has a heavier build are older than the images of the user in which the user has a slimmer build. From such information, the advertising targeting metric derivation 170 can determine that the user has improved their eating and exercising habits. Alternatively, the advertising targeting metric derivation 170 can take into account time-based metadata by simply assigning greater weight or importance to the images, from among the selected images, which are more recent. Thus, a user whose recent images indicate the presence of glasses can be determined to be an eyeglasses wearer even if older images do not indicate the presence of eyewear.

In another embodiment, the images may comprise geographic metadata indicating the location in which such images were taken. In such an embodiment, the advertising targeting metric derivation 170 can, for example, determine whether the user travels frequently by referencing the geographic metadata of the selected images.

Another form of metadata that can be taken into account can be context metadata. More specifically, if a series of images being analyzed shares a common context, the images can provide greater insight into the user. For example, if each image in a series of images is a profile image, such as a user would utilize to identify themselves within a networked community, or within the context of social networking, then changes to such a profile image can indicate important changes on the part of the user, and can be utilized to further derive advertising targeting metrics.

Each of the advertising targeting metrics derived by the advertising targeting metric derivation 170 can be stored in the user store 145 and can be, therein, associated with the appropriate user identity. The storage of such derived advertising targeting metrics is illustrated in the system 100 of FIG. 1 by the communication 195.

Advertisers can then utilize the advertising targeting metrics to more accurately target their advertisements to an audience that comprises aspects or attributes that the advertisers believe will make such an audience more receptive to the products or services that those advertisers are advertising. For example, advertisers advertising hair care products can target such advertisements to users that color their hair, as opposed to users who are bald. To aid such advertisers in targeting their advertisements, given the additional advertising targeting metrics that can have been derived by the above described mechanisms, an advertising targeting metric interface 175 can be provided by the advertising server computing device 110 to one or more advertisers 150.

In one embodiment, such an advertising targeting metric interface 175 can comprise traditional interface elements to enable advertisers to target their advertisements based on one or more of the advertising targeting metrics that were derived by the above described records. Such traditional interface elements can include drop-down menus, checkboxes, and other like selection mechanisms that can be organized via traditional "must-have" and "like-to-have" criteria, where advertisements specifying "must-have" targeting criteria will not be displayed unless the user to which they are displayed is associated with such targeting criteria, while advertisements specifying "like-to-have" targeting criteria may be displayed to users that are not associated with such targeting criteria, except that the display of such advertisements, in such cases, may be performed at a reduced cost to the advertiser. The traditional interface elements can, in one embodiment, also enable advertisers to select or limit certain targeting metrics, including image-derived targeting metrics. For example, advertisers can limit the images from which targeting metrics were derived based on quantifiable information, such as the date of the image. Thus, an advertiser of designer eyeglasses, for example, can limit their targeting criteria by indicating that they desire their advertisements to be shown to users determined to be eyeglass wearers only from an analysis of images that are less than, for example, 120 days old.

In another embodiment, the advertising targeting metric interface 175 can enable advertisers to select advertising targeting metrics derived from the above described image analysis based upon one or more submissions of images of exemplary targeted users. More specifically, an advertiser, such as one of the advertisers 150, can provide, as part of the interface 175, one or more images of individuals and request, via the interface, that their advertisements be targeted to individuals that share the same characteristics as those in the provided images. The advertising server computing device 110 can then analyze the provided images in the same manner as described above, and derive therefrom a set of advertising targeting metrics which the advertising server computing device can then consider as the advertising targeting metrics that are desired by that advertiser for their advertisements. Such an interface can enable the advertisers 150 to literally provide images and indicate that they wish to have their advertisements targeted to "people like this".

To provide greater clarity and feedback to advertisers, such as the advertisers 150, the advertising targeting metric interface 175 can display an avatar that represents the advertising targeting metrics selected by the advertiser. Such an avatar, or virtualized representation of a human, can enable the advertiser to visualize the sort of individual to which their advertisements will be targeted given the currently selected advertising targeting metrics. Alternatively, or in addition, rather than submitting images of exemplary targeted users, the interface 175 can enable advertisers to generate avatars, or other virtualized representations of humans, and submit those as input specifying the sort of targeting the advertisers seek for their advertisements.

As part of the advertising targeting metrics interface 175, the advertising server computing device 110 can enable the advertisers 150 to provide customized advertisements that are to be displayed given certain targeting criteria. Such customized advertisements can be stored, as illustrated by the communication 196, in an advertising store 155 that is communicationally coupled to the advertising server computing device 110. Subsequently, when the advertising server computing device 110 detects that a user with a relevant user identity, as determined by reference to the user store 145, is available in the sense that they can have advertisements displayed to them, the advertising server computing device can obtain the appropriate advertisements from the advertisement store 155 and display them to the user.

While the image crawler 160, image analysis 165, advertising targeting metric derivation 170, and advertising targeting metric interface 175 have been described above, in showing the system 100 of FIG. 1, as being part of a single advertising server computing device 110, it is likewise equally contemplated that any one or more of those elements can be part of one or more other server computing devices. Likewise, it is also equally contemplated that any one or more of those elements can be combined into a single component, program, or collection of computer-executable instructions.

Figure 2:
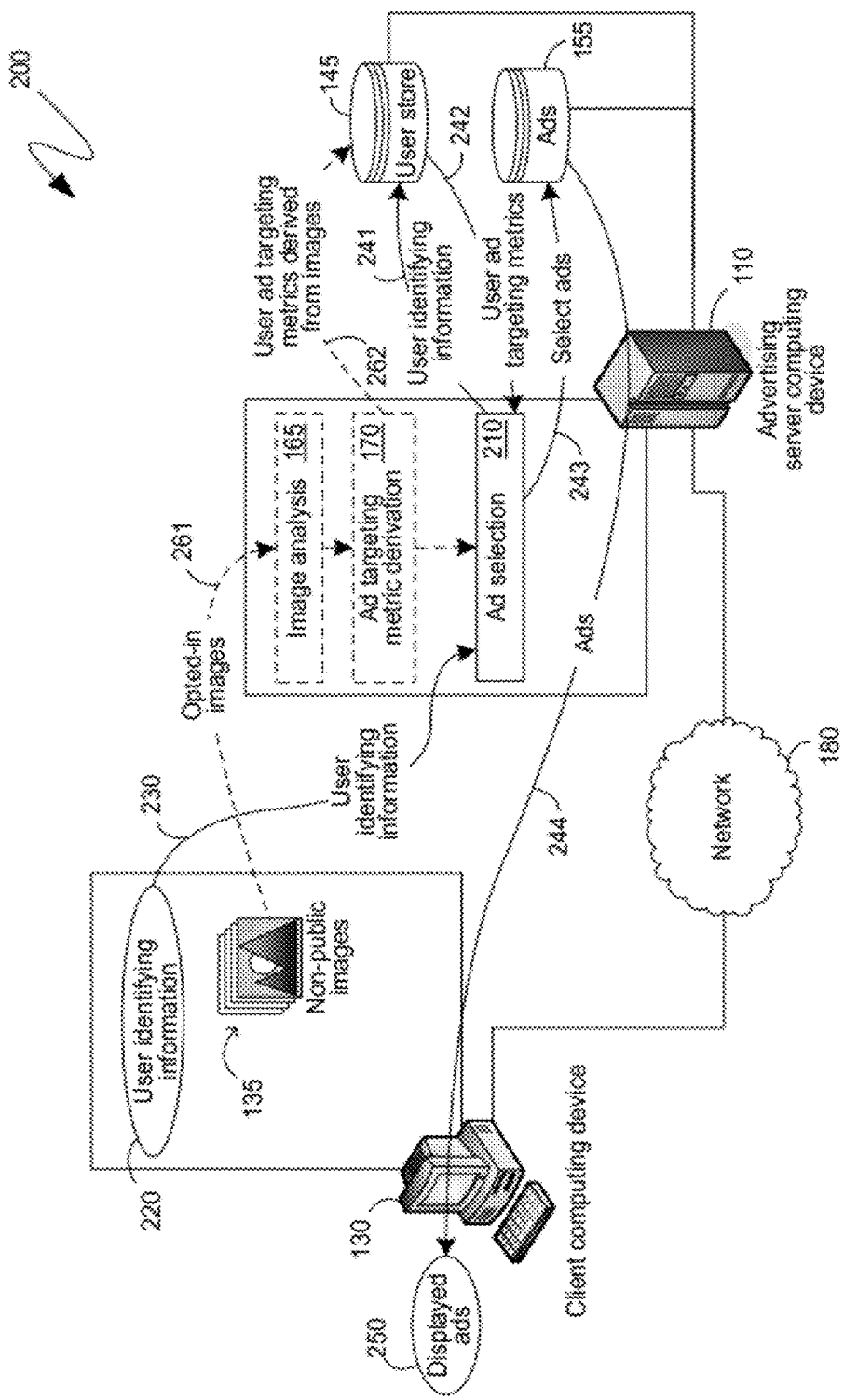
FIG. 2 is a block diagram of an exemplary targeting of advertisements based on image-derived advertising targeting metrics.

Turning to FIG. 2, the system 200 shown therein illustrates an exemplary provision of advertisements to a user based on advertising targeting metrics that were derived from images associated with the user and also based on the selection of those targeting metrics by an advertiser. Initially, a user can interact with one or more entities via the network 180. For example, a user can log on to a website, or other like resource, on the network 180, using a particular user identifier. An advertising server computing device, such as the advertising server computing device 110, can be made aware of a user utilizing a particular user identifier on a given website, such as by receiving a "cookie" or similar data structure directly from the client computing device 130, or such as through backchannel communications between the computing devices hosting such a website and the advertising server computing device in a manner that is well-known to those skilled in the art. Typically, a user would have logged on to such a website, or other like resource on the network 180, by utilizing a client computing device, such as the client computing device 130 shown in FIG. 2. Thus, user identifying information, such as the user identifying information 220, can be entered by the user into the client computing device 130 and communicated therefrom to one or more server computing devices, such as those that can be hosting the website on to which the user logged on. Typically, when a user logs onto a website, a small file known as a "cookie" can be created and stored on the client computing device 130. Thus, the advertiser server computing device 110 can receive user identifying information either from the server computing devices hosting the website on to which the user logged on, or from the user's computing device directly, such as by receiving or accessing the relevant "cookie". The communication 230 shown in the system 200 of FIG. 2 is meant to illustrate either of such communications.

An advertising selection mechanism 210, executing on the advertising server computing device 110, can utilize the user identifying information, and the information previously stored in the user store 145, to select one or more advertisements that would be appropriate to display to the user. More specifically, as illustrated in the system 200 of FIG. 2, the advertising selection mechanism 210 can provide the user identifying information 220 to the user store 145, as illustrated by the communication 241. In response, as illustrated by the communication 242, the advertising selection mechanism 210 can obtain the advertising targeting metrics associated with the individual whose user identifying information was provided. With the advertising targeting metrics, the advertising selection mechanism 210 can select, as illustrated by the communication 243, one or more advertisements, from among the advertisement store 155, to be displayed to such an individual. Such a selection can be based on known advertising mechanisms for selecting advertisements given established targeting criteria, such as, for example, by taking into account whether a given advertisement is only to be displayed to individuals having certain advertising targeting metrics, or whether the relevant advertising targeting metrics are merely a "like-to-have" condition, and also, for example, by taking into account how often the considered advertisement has already been displayed within a relevant time period. Additionally, existing advertising networks, such as those based on keywords or fixed placement of advertisements can be augmented, such as by augmenting the targeting criteria already established and being utilized by those existing advertising networks.

Once the advertising selection mechanism 210 has selected one or more advertisements, as illustrated by the communication 243, from the advertising store 155, the advertising server computing device 110 can transmit those advertisements, via whatever website or other network entity the user had logged in to, to the client computing device 130 that the user is utilizing, thereby causing the client computing device to display those advertisements 250. The communication 244, shown in the system 200 of FIG. 2, is meant to illustrate such an indirect transmission of advertisements from the advertising store 155, which is communicationally coupled to the advertising server computing device 110, to, ultimately, the client computing device 130, that is being utilized by the user, in order to display the advertisements 250 to such a user.

In one optional embodiment, also illustrated in the system 200 of FIG. 2, and signified via the dashed lines, a user can allow their non-public images, such as the non-public images 135, to be analyzed for deriving therefrom advertising targeting metrics. As indicated previously, such non-public images 135 can comprise images that a user may keep on the client computing device 130, but which the user has not made publicly available, such as through social networking infrastructure, and the such non-public images can also comprise images that are generated by a user while that user is using the client computing device, such as images that are part of a video conference in which the user is participating with the client computing device.

In one optional embodiment, the user can not only allow their non-public images 135 to be analyzed, but can also allow such an analysis to take place remotely from the client computing device 130, such as, for example, as part of utilizing an advertising-sponsored computer application program, or, due to financial or other incentives offered to such a user. In such optional embodiment, as illustrated by the components and communications having dashed lines in the system 200 of FIG. 2, the user's non-public images 135 can be provided, either directly or indirectly, to the image analysis 165 described in detail above, and illustrated in FIG. 2 by the communication 261. Subsequently, as before, the image analysis 165 can analyze the images to select those images from which advertising targeting metrics associated with the user can be derived. The selected images can then be provided to the advertising targeting metric derivation 170, which can also operate in the manner described in detail above. The additional advertising targeting metrics, or the greater accuracy, or level of confidence, achieved from the additional processing of a user's non-public images, can also be stored in the user store 145, as illustrated by the communication 262 shown in the system 200 of FIG. 2. The selection of advertisements to be displayed to a user, performed by the advertising selection mechanism 210, can be based on the additional information obtained from the user's non-public images 135.

Figure 3:
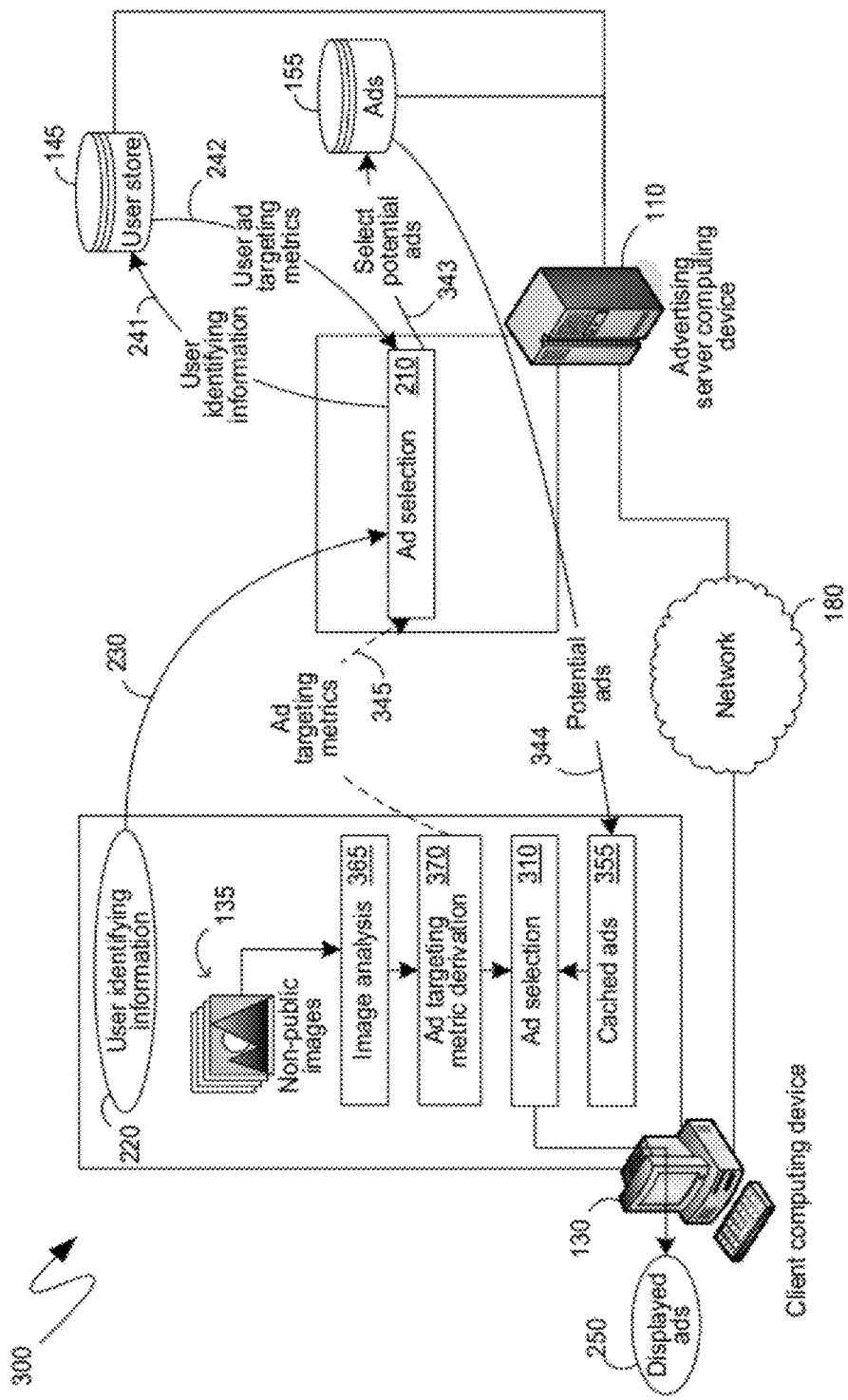
FIG. 3 is a block diagram of an exemplary targeting of advertisements based on advertising targeting metrics obtained from local processing of non-public images.

In another optional embodiment, the user can allow their non-public images 135 to be analyzed, but can, due to security and privacy concerns, prevent the transfer of such images to a computing device other than the client computing device 130 on which such images are resident. Consequently, any analysis of those images can be performed only on the client computing device 130. Turning to FIG. 3, the system 300 shown therein illustrates exemplary mechanisms by which a user's non-public images 135 can be analyzed locally on the client computing device 130, but yet can still inform the selection of advertisements shown to a user.

As can be seen from the system 300 of FIG. 3, the advertising server computing device 110 can still provide advertisements to the client computing device 130, such as is illustrated by the communication 344. However, the advertisements provided by the communication 344 can be merely potential advertisements that can then be cached at the client computing device 130 in the form of the cached advertisements 355. More specifically, as described in detail above, the user identifying information 220 can be provided, traditionally indirectly, via the communication 230 to the advertising selection mechanism 210. The advertising selection mechanism 210 can then, via the communications 241 and 242, provide such user identifying information to the user store 145, and derive therefrom advertising targeting metrics associated with the individual identified by the user identifying information. Based on the advertising targeting metrics received from the user store 145, the advertising selection mechanism 210 can select potential advertisements from among the advertisement store 155, as illustrated by the communication 343, and can provide such potential advertisements to the client computing device 130, as shown by the communication 344.

In one embodiment, it is possible that the user store 145 has no advertising targeting metrics associated with the individual identified by the user identifying information provided by the advertising selection mechanism 210 via the communication 241. In an analogous embodiment, it is also possible that no user identifying information 220 is received by the advertising selection mechanism 210. In such embodiments, the advertising selection mechanism 210 can select potential advertisements, as shown by the communication 343, based upon other more typical advertising targeting factors, such as the likely age and gender of the user based on the relevant network site being visited. Such potential advertisements can be provided to the client computing device 130 as the cached advertisements 355, as illustrated by the communication 344. In addition to the raw advertisement data itself, the cached advertisements 355 can also include the relevant advertising targeting criteria to which such advertisements are directed, if any. Alternatively, in an optional embodiment, the advertising targeting metric derivation 370, described in further detail below, can provide advertising targeting metrics, obtained from the non-public images 135, to the advertising selection 210, as illustrated by the optional communication 345. Such an embodiment can be optional due to potential privacy concerns. As will be recognized by those skilled in the art, such privacy concerns can be minimized through the communication of only specific types of advertising targeting metrics.

On the client computing device 130, an image analysis 365, that is analogous to the image analysis 165, and can operate in an analogous manner to that described above with reference to the image analysis 165. Subsequently, advertising targeting metric derivation 370, that is analogous to the advertising targeting metric derivation 170, and can operate an analogous manner to that described above with reference to the advertising targeting metric derivation 170, can derive advertising targeting metric from those images selected by the image analysis 365. An advertising selection mechanism 310, that is analogous to the advertising selection mechanism 210, and can operate in an analogous manner to that described above with reference to the advertising selection mechanism 210, can select advertisements, from among the cached advertisements 355, that are to be displayed to the user given the advertising targeting metrics that were derived from the non-public images 135 by the image analysis 365 and the advertising targeting metric derivation 370.

For example, a user of the client computing device 130 can log on to an instant messaging service, via the network 180, and can initiate a video conference with one or more other users with such an instant messaging service. The user identifying information 220 can be the username utilized to logon to such an instant messaging service. As a consequence, the advertising server computing device 110 can select one or more potential advertisements, as illustrated by the communication 343, based on such user identifying information 220, in the manner described in detail above. The potential advertisements can then be provided to the client computing device 130 via the communication 344, and can be cached thereon as the cached advertisements 355. As the user is participating in the video conference, the image analysis 365 can analyze images of the user that are being generated as part of the video conference, since, as will be recognized by those skilled in the art, the video of the video conference is merely a sequence of images, and any one or more of those images can be selected and analyzed by the image analysis 365 and the advertising targeting metric derivation 370 in the same manner as described above. Thus, for example, if the image analysis 365 and the advertising targeting metric derivation 370 determine that the user is smiling for a large percentage of the images being received from such a video conference, the advertising selection mechanism 310 can select from among the cached advertisements 355 of those advertisements that are to be displayed if the user is deemed to be "happy". Or, alternatively, the advertising selection 310 can directly request advertisements that are to be displayed if the user is deemed to be "happy" directly from the advertising server computing device 110 and display such advertisements when they are received from the advertising server computing device. Furthermore, because such images can be known to have been generated in real-time, they can be assumed to comprise the most recent information associated with the user from which advertising targeting metrics can be derived. The real-time generation of such images can also enable the advertising targeting metric derivation 370 to search for and identify different types of advertising targeting metrics, such as the above example in which a user's facial expressions can be monitored to derive the user's mood. In such a manner, the displayed advertisements 250 can be based, not only on advertising targeting metrics that may have been derived from publicly available images, such as that described previously, but can also be based on advertising targeting metrics derived from non-public images 135, including images being generated in real-time.

Figure 4:
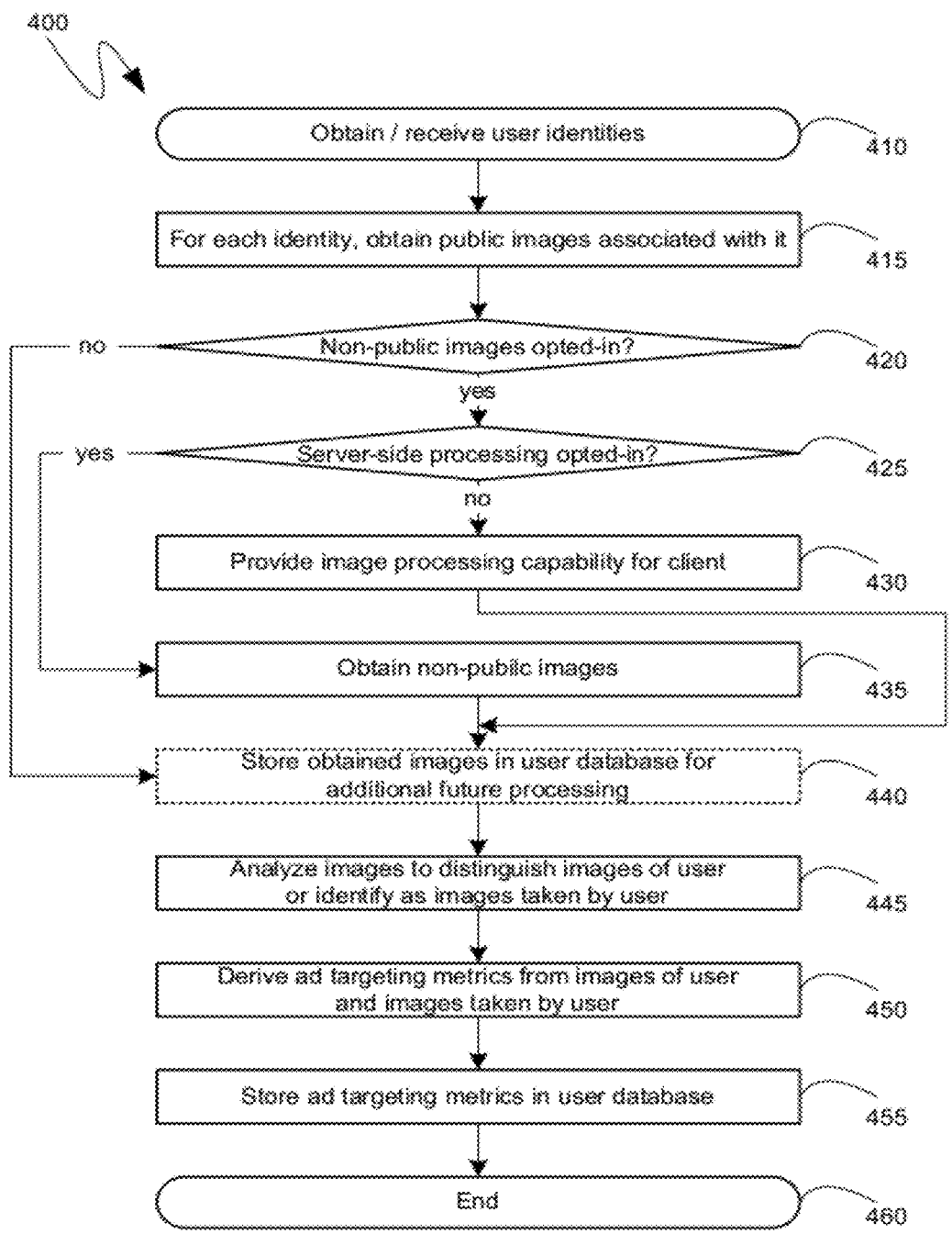
FIG. 4 is a flow diagram of an exemplary mechanism for deriving advertising metrics from images associated with users.

Turning to FIG. 4, the flow diagram 400 shown therein illustrates an exemplary series of steps by which advertising targeting metrics can be derived from images associated with a user. Initially, at step 410, one or more user identities can be received. Subsequently, at step 415, public images associated with each of the one or more user identities can be obtained. As indicated previously, the obtaining of public images associated with each of the one or more user identities at step 415 can comprise searching known image-centric, social networking and other like sites on the network 180, shown previously in FIGS. 1-3, for public images associated with each of the one or more user identities.

If an individual represented by one or more of the user identities has opted-in to allowing non-public images to be processed remotely from that individual's client computing device, as can be determined by steps 420 and 425, processing can proceed to step 435 and can, at step 435, obtain such non-public images as well. If, however, the user has opted in to allowing nonpublic images to be processed, and has not opted in to allowing such processing to be performed remotely, again as determined by steps 420 and 425, respectively, processing can proceed to step 430 at which point image processing capability can be provided to the client computing device, if such capability does not already exist on the client computing device.

Once images have been obtained in step 415 and, if appropriate, at step 435, processing can proceed to step 440, in which, optionally, as indicated by the dashed outline, the obtained images can be stored in the user database for possible additional future processing. Subsequently, the images can be analyzed, at step 445 to distinguish the images of the individual believed to be the user identified by the user identity with which the analyzed set of images is associated and to distinguish the images believed to have been taken by the user identified by the user identity with which the analyzed set of images is associated. As described in detail above, the image analysis of step 445 can comprise facial recognition, to distinguish humans from other image elements, and image differentiation, to distinguish among different humans in the various images. As also described in detail above, the image analysis of step 445 can comprise an analysis of meta-data and contextual analysis to determine which images may have been taken by the user whose user identity was associated with the images. Once a set of images is selected by the image analysis at step 445, that selected set of images can be analyzed at step 450 to derive advertising targeting metrics from those images. As described in detail previously, the derivation of advertising targeting metrics at step 450 can include determining an individual's physical attributes, such as their hair color, skin color, relative size, whether they wear glasses, and the like, and can also determine an individual's habits or history, such as whether they, may be a parent or a lover of certain types of pets, or whether they prefer indoor or outdoor activities, or daytime or nighttime, activities. Once the advertising targeting metrics have been derived at step 450, they can be stored in the user database, at step 455, in association with the user identity from whose pictures they were derived. The relevant processing can then end at step 460.

Figure 5:
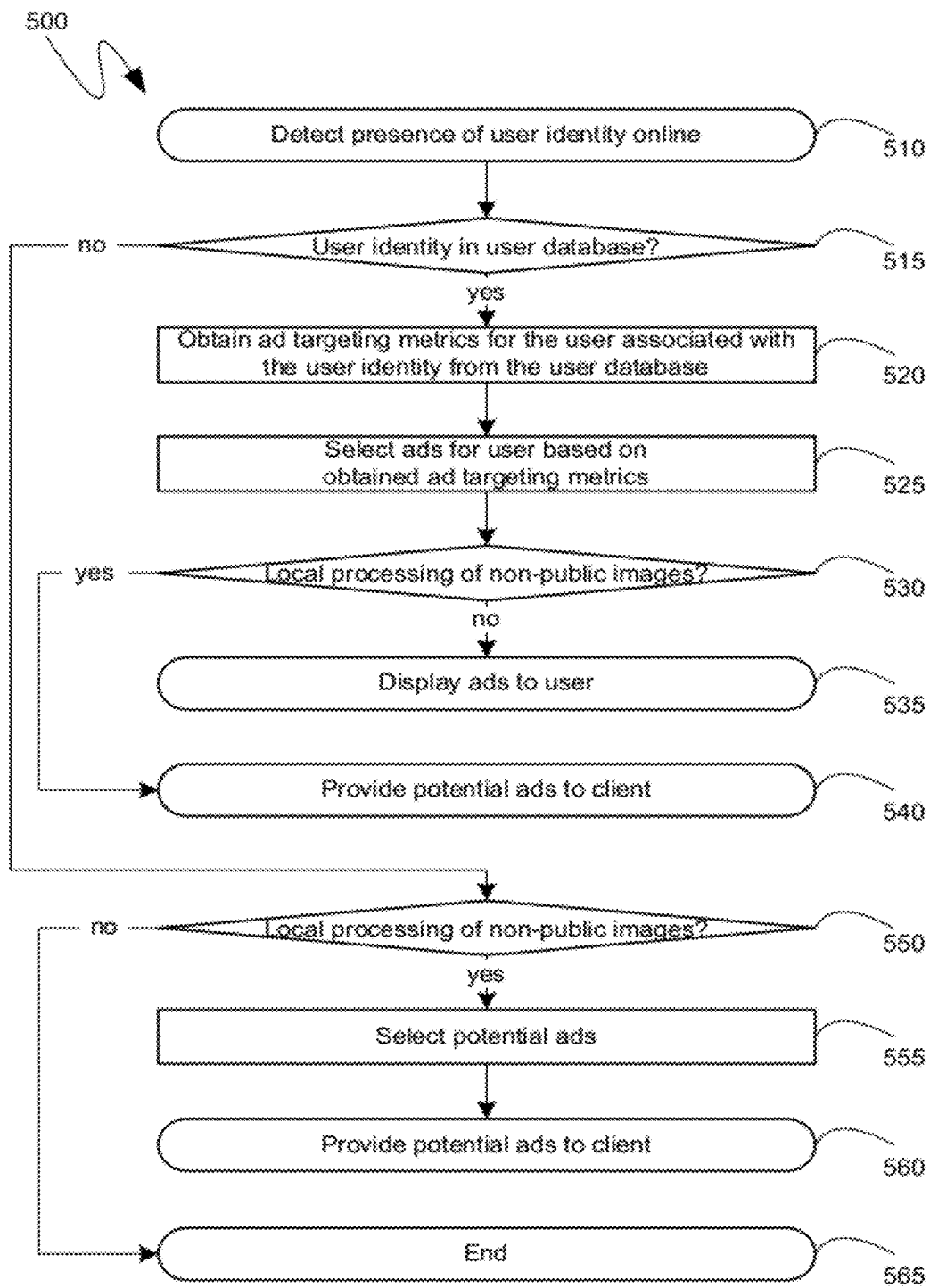
FIG. 5 is a flow diagram of an exemplary mechanism for selecting advertising for specific users based on image-derived targeting metrics.

Trying to FIG. 5, the flow diagram 500 shown therein illustrates an exemplary series of steps by which advertisements can be displayed to specific individuals based upon advertising targeting metrics derived from images associated with those specific individuals. Initially, at step 510, the presence of a user having a user identity can be detected via network communications. For example, as indicated previously, when a user logs on to a social networking website, an instant messaging service, or other like network presence, the user identity with which the user logged on cam, ultimately, be provided, or detected, as indicated at step 510. Subsequently, a search can be made, at step 515, of an existing user database to determine if the user identity from step 510 is in the user database. If, at step 515, it is determined that the user identity is in the user database, advertising targeting metrics of the individual associated with the user identity can be obtained from the user database at step 520. Subsequently, at step 525, advertisements can be selected to be displayed to such an individual based on the advertising targeting metrics obtained at step 520. As indicated previously, the selection of advertisements based on advertising targeting metrics, such as that performed at step 525, can be done utilizing known advertising techniques.

If the user associated with the user identity from step 510 has selected to allow their non-public images to also be processed, but has required that such processing be performed locally, such as can be determined at step 530, then the advertisements selected at step 525 may only be potential advertisements, as the ultimate advertisements that can be displayed to the user can be further informed by the local processing of non-public images, as described in detail above. Thus, as shown in step 540, the advertisements selected at step 525 can be provided to the client as potential advertisements. Conversely, if no further local processing of non-public images is to be performed, as, again, can be determined by step 530, Then the advertisements selected in step 525 can be provided to, or otherwise displayed to, the user at step 535.

If, at step 515, the user identity from step 510 was not found in the user database, processing can skip to step 550 at which point a determination can be made as to whether there may be additional local processing of non-public images associated with the user whose user identity was the connected at step 510. If, at step 550, is determined that no such further local processing is to be performed, the relevant processing can end at step 565. Conversely, if, at step 550, is determined that additional local processing of non-public images may be performed, processing can proceed to step 555 during which potential advertisements can be selected, such as based upon generic criteria, as described in detail above. Alternatively, at step 555, advertisements can be selected based upon advertising targeting metrics that can have been derived on the user's computing device as part of the local processing of non-public images. In such an alternatively, the processing of step 555 can be analogous to that of step 525, described above. The advertisements selected at step 555 can then be provided to the client, at step 560, as potential advertisements from which the advertisements that are ultimately displayed can be selected, such as based on advertising targeting metrics derived from the local processing of non-public images. Of course, as indicated previously, processing on the user's computing device can directly request one or more advertisements, or types of advertisements, to display. In such a case, the requested advertisements, or types of advertisements, can simply be provided and, for clarity of illustration, the flow diagram 500 of FIG. 5 does not show such a process.

Figure 6:
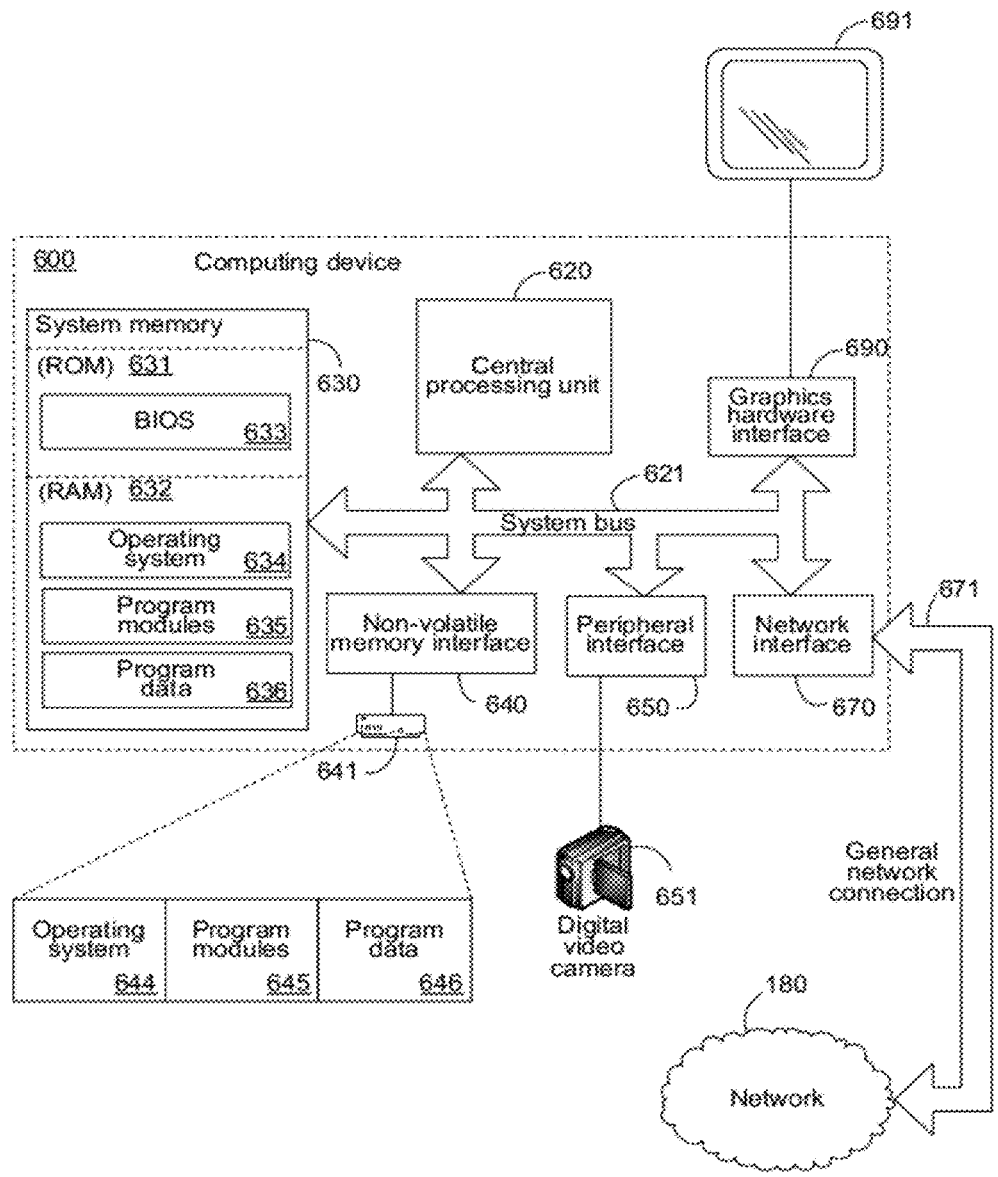
FIG. 6 is a block diagram of an exemplary computing device.

Turning to FIG. 6, an exemplary computing device 600 is illustrated upon which, and in conjunction with which, the above-described mechanisms can be implemented. The exemplary computing device 600 can be any one or more of the client computing device 130, the social networking server computing device 120 and the advertising server computing device 110 illustrated in the previously referenced Figures and described in more detail above. The exemplary computing device 600 of FIG. 6 can include, but is not limited to, one or more central processing units (CPUs) 620, a system memory 630, that can include RAM 632, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, such as for the display of visual user interfaces, including, but not limited to, a graphics hardware interface 690 and a display device 691. Additionally, the computing device 600 can also include graphics input hardware such as a digital video camera 651 with which the user of the computing device 600 can, for example, engage in video conferences or video messaging. The graphics input hardware, such as the digital video camera 651, can be communicationally coupled to the system bus 621 via a peripheral interface 650.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and the aforementioned RAM 632. A basic input/output system 633 (BIOS), containing the basic routines that help to transfer information between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates the operating system 634 along with other program modules 635, and program data 636.

The computing device 600 may also include other removable/non-removable, volatile/nonvolatile computer storage media. By way of example only, FIG. 6 illustrates the hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 can operate in a networked environment using logical connections to one or more remote computers. The computing device 600 is illustrated as being connected to the general network connection 671 through a network interface or adapter 670 which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 671. It will be appreciated that the network connections shown are exemplary and other means of establishing a communications link between computing devices may be used.

As can be seen from the above descriptions, mechanisms for deriving and utilizing advertising targeting metrics from digital images have been enumerated. In view of the many possible variations of the subject matter described herein, we claim as our invention all such embodiments as may come within the scope of the following claims and equivalents thereto.

We claim:

1. A computing device comprising:
one or more processing units; and
one or more computer-readable hardware memory comprising computer-executable instructions for automatically deriving a user's physical attributes and preferences from images associated with the user, the computer-executable instructions, when executed by the one or more processing units, cause the computing device to:
obtaining user identity information that identifies the user on one or more image-centric websites;
searching at least some of the one or more image-centric websites for public digital images associated with the user by referencing the obtained user identity information;
perform facial recognition on at least a portion of the public digital images, associated with the user, which were obtained from the searching of the image-centric websites;
identify, as a face of the user, a face detected by the facial recognition in a greater quantity of the at least the portion of the public digital images associated with the user than any other face detected in those digital images by the facial recognition;
digitally filter the public digital images associated with the user to retain only those digital images that are either determined to comprise the user, based on the facial recognition detecting the identified face of the user in those digital images, or that are determined to have been taken by the user;
apply digital image analysis algorithms to the filtered digital images to identify physical attributes of the user;

apply digital image analysis algorithms to the filtered digital images to identify at least some preferences of the user;

improve accuracy of the identified physical attributes of the user and the identified preferences of the user with information obtained by applying, on a client computing device, digital image analysis algorithms to non-public digital images that are exclusive of the public digital images available from the image-centric websites, wherein the digital image analysis algorithms are applied such that the non-public digital images are retained by the digital image analysis algorithms only on the client computing device; and digitally store, on a storage device communicationally coupled to the computing device, the identified physical attributes of the user and the identified preferences of the user with the obtained user identity.

2. The computing device of claim 1, wherein the deriving advertising targeting metrics for the user by identifying physical attributes of the user comprises deriving advertising targeting metrics for the user by identifying physical attributes of the user that have changed across multiple ones of the filtered images.

3. The computing device of claim 1, wherein the deriving advertising targeting metrics for the user by deducing the user's preferences comprises analyzing environments of the filtered images and deriving advertising targeting metrics for the user based upon an environment common to a meaningful number of the filtered images.

4. The computing device of claim 1, wherein the deriving advertising targeting metrics for the user by deducing the user's preferences comprises analyzing subjects of the filtered images and deriving advertising targeting metrics for the user based upon subjects common to a meaningful number of the filtered images.

5. The computing device of claim 1, wherein the deriving advertising targeting metrics for the user by identifying physical attributes of the user and the deriving advertising targeting metrics for the user by deducing the user's preferences are based upon image metadata.

6. The computing device of claim 5, wherein the deriving advertising targeting metrics for the user by identifying physical attributes of the user and the deriving advertising targeting metrics for the user by deducing the user's preferences comprise assigning greater importance to recent images from among the filtered images, as determined by reference to the image metadata.

7. The computing device of claim 1, wherein the one or more computer-readable hardware memory comprise further computer-executable instructions, which, when executed by the one or more processing units, cause the computing device to: search the user store for the derived advertising targeting metrics associated with a user identity to which advertisements can be directed; compare the advertising targeting metrics associated with the user identity to advertising targeting metrics specified for one or more advertisements; and select, based upon the comparing, one or more advertisements to display to the user associated with the user identity.

8. The computing device of claim 1, wherein the one or more computer-readable hardware memory comprise further computer-executable instructions, which, when executed by the one or more processing units, cause the computing device to: presenting an advertiser user interface enabling advertisers to select one or more of the advertising targeting metrics for their advertisements, the advertiser user interface enabling the advertisers to submit at least one image of an exemplary targeted user; derive advertising targeting metrics for the exemplary targeted user by identifying physical attributes of the exemplary targeted user from the submitted at least one image; derive advertising targeting metrics for the exemplary targeted user by deducing the exemplary targeted user's preferences from the submitted at least one image; and associating the derived advertising targeting metrics for the exemplary targeted user with the advertisements of the advertiser.

9. The computing device of claim 8, wherein the advertiser user interface enables advertisers to generate an avatar of the exemplary targeted user, and wherein further the submitted at least one image is the generated avatar.

10. A computing device comprising:
one or more computer-readable hardware memory comprising computer-executable instructions for selecting digital media for a user, the computer-executable instructions directed to steps comprising:
obtaining non-public digital images associated with the user from a client computing device utilized by the user, the non-public digital images being exclusive of public digital images available from image-centric websites;
performing facial recognition on at least a portion of the obtained non-public digital images, associated with the user, which were obtained from the client computing device;
identifying, as a face of the user, a face detected by the facial recognition in a greater quantity of the at least the portion of the obtained non-public digital images associated with the user than any other face detected in those digital images by the facial recognition;
digitally filtering the non-public digital images associated with the user to retain only those digital images that are either determined to comprise the user, based on the facial recognition detecting the identified face of the user in those digital images, or that are determined to have been taken by the user;
applying digital image analysis algorithms to the filtered digital images to identify physical attributes of the user;
applying digital image analysis algorithms to the filtered digital images to identify at least some preferences of the user;
searching the digital media for digital media having targeting metrics matching the identified physical attributes of the user or the identified preferences of the user; and
triggering a physical displaying, on a physical display device communicationally coupled to the client computing device utilized by the user, of at least some of the digital media that has targeting metrics matching the identified physical attributes of the user or the identified preferences of the user;
wherein the computer-executable instructions execute on the client computing device such that the non-public images are retained by the computer-executable instructions only on the client computing device.

11. The computing device of claim 10, wherein the selecting the one or more advertisements to display to the user comprises requesting the one or more advertisements from a remote computing device.

12. The computing device of claim 10, wherein the obtaining the non-public images comprises capturing images from a video conference.

13. The computing device of claim 10, wherein the selecting the one or more advertisements to display to the user comprises selecting the one or more advertisements from among locally cached advertisements, the locally cached advertisements being provided as potential advertisements because the advertising targeting metrics specified for the locally cached advertisements were similar to advertising targeting metrics for the user that were derived from public images associated with a user identity utilized by the user.

14. The computing device of claim 11, wherein the computer-executable instructions are executed on a computing device comprising the non-public images.

15. A system comprising:
one or more server computing device performing steps comprising:
  obtaining user identity information that identifies a user on one or more image-centric websites;
  searching at least some of the one or more image-centric websites for public digital images associated with the user by referencing the obtained user identity information;
  performing a first facial recognition on at least a portion of the public digital images, associated with the user, which were obtained from the searching of the image-centric websites;
  identifying, as a face of the user, a face detected by the first facial recognition in a greater quantity of the at least the portion of the public digital images associated with the user than any other face detected in those digital images by the first facial recognition;
  digitally filtering the public digital images associated with the user to retain only those digital images that are either determined to comprise the user, based on the first facial recognition detecting the identified face of the user in those digital images, or that are determined to have been taken by the user;
  applying digital image analysis algorithms to the filtered digital images to identify physical attributes of the user;
  applying digital image analysis algorithms to the filtered digital images to identify at least some preferences of the user;
  searching digital media, stored on a storage device communicationally coupled to the server computing device, for digital media having targeting metrics matching the identified physical attributes of the user or the identified preferences of the user; and
  transmitting to at least one client computing device, to be locally cached thereon, at least some of the digital media that has targeting metrics matching the identified physical attributes of the user or the identified preferences of the user; and
at least one client computing device performing steps comprising:
  obtaining non-public digital images associated with the user, the non-public digital images being exclusive of the public digital images available from the image-centric websites;
  performing a second facial recognition on at least a portion of the obtained non-public digital images associated with the user;
  identifying, as the face of the user, a face detected by the second facial recognition in a greater quantity of the at least the portion of the obtained non-public digital images associated with the user than any other face detected in those digital images by the second facial recognition;
  digitally filtering the non-public digital images associated with the user to retain only those digital images that are either determined to comprise the user, based on the second facial recognition detecting the identified face of the user in those digital images, or that are determined to have been taken by the user;
  applying digital image analysis algorithms to the filtered digital images to identify additional physical attributes of the user;
  applying digital image analysis algorithms to the filtered digital images to identify additional preferences of the user;
  searching the locally cached digital media for digital media having targeting metrics matching the identified additional physical attributes of the user or the identified additional preferences of the user; and
  generating a physical display, on a physical display device communicationally coupled to the at least one client computing device, of at least some of the locally cached digital media that has targeting metrics matching identified additional physical attributes of the user or the identified additional preferences of the user.

16. The system of claim 15, further comprising an advertiser user interface for enabling advertisers to select one or more of the advertising targeting metrics for their advertisements by submitting at least one image of an exemplary targeted user, the advertiser user interface comprising computer-executable instructions for:
  deriving advertising targeting metrics for the exemplary targeted user by identifying physical attributes of the exemplary targeted user from the submitted at least one image;
  deriving advertising targeting metrics for the exemplary targeted user by deducing the exemplary targeted user's preferences from the submitted at least one image; and
  associating the derived advertising targeting metrics for the exemplary targeted user with the advertisements of the advertiser.

17. The system of claim 15, wherein at least some of the deriving advertising targeting metrics for the user by identifying physical attributes of the user, the deriving advertising targeting metrics for the user by deducing the user's preferences, the deriving further advertising targeting metrics for the user by identifying physical attributes of the user, and the deriving further advertising targeting metrics for the user by deducing the user's preferences are based upon image metadata.

18. The system of claim 15, wherein the image-centric sites comprise social-networking web sites.

19. The computing device of claim 1, wherein the one or more computer-readable hardware memory comprise further computer-executable instructions, which, when executed by the one or more processing units, cause the computing device to: detecting, from among the public digital images, associated with the user, which were obtained from the searching of the image-centric websites, images showing identifiable humans; and selecting the detected images as the at least the portion of the public digital images on which the facial recognition will be performed.

* * * * *